United States Patent [19]

Wiart

[11] 3,906,314

[45] Sept. 16, 1975

[54] DEVICE FOR REGULATING AND SWITCHING CURRENTS FROM A CONSTANT D.C. SOURCE INTO THE WINDINGS OF AN A.C. MACHINE

[75] Inventor: Albert Wiart, Sannois, France

[73] Assignee: Jeumont-Schneider, Paris, France

[22] Filed: Jan. 18, 1974

[21] Appl. No.: 434,692

[30] Foreign Application Priority Data
Jan. 24, 1973 France .............................. 73.02373

[52] U.S. Cl. ................ 318/138; 318/227; 318/212; 318/254
[51] Int. Cl.$^2$ ......................................... H02K 29/00
[58] Field of Search ................... 318/138, 209–212, 318/227, 230, 231, 254

[56] References Cited
UNITED STATES PATENTS

| | | | |
|---|---|---|---|
| 3,262,036 | 7/1966 | Clarke et al. ................... | 318/227 X |
| 3,423,662 | 1/1969 | Schlabach et al. .............. | 318/227 X |
| 3,548,275 | 12/1970 | Inagaki et al. .................. | 318/211 |
| 3,815,003 | 6/1974 | Wiart ............................... | 318/227 X |

*Primary Examiner*—G. Z. Rubinson
*Attorney, Agent, or Firm*—Robert E. Burns; Emmanuel J. Lobato; Bruce L. Adams

[57] ABSTRACT

A system for the control and commutation of current from a D.C. source into the windings of a polyphase A.C. machine. Terminals are provided for connecting the system in series with terminals of a D.C. source. A single current chopper is connected to the current source and provides D.C. currents adjustable to a given value. A smoothing inductor smoothes the currents from the chopper. A thyristor routing bridge has $2n$ arms with $n$ mid-points respectively connected to $n$ phase terminals of the A.C. machine. The ends of each of two groups are respectively connected to the smoothing inductor output and a negative terminal of the D.C. source. The bridge is configured and controllable so that D.C. current supplied by the chopper and the smoothing inductor is cyclically routed to the windings of the $n$ phasese of the A.C. machine. A diode commutating bridge having $2n$ arms with $n$ mid-points respectively connected to the $n$ phase terminals of the A.C. machine is provided. A de-energizing circuit de-energizes the thyristors of the routing bridge and a switching circuit progressively transfers the current from the commutating bridge to the routing bridge. Selectors are provided for isolating certain of said circuits and an auxiliary switching circuit for generator and braking operation of the A.C. machine.

2 Claims, 1 Drawing Figure

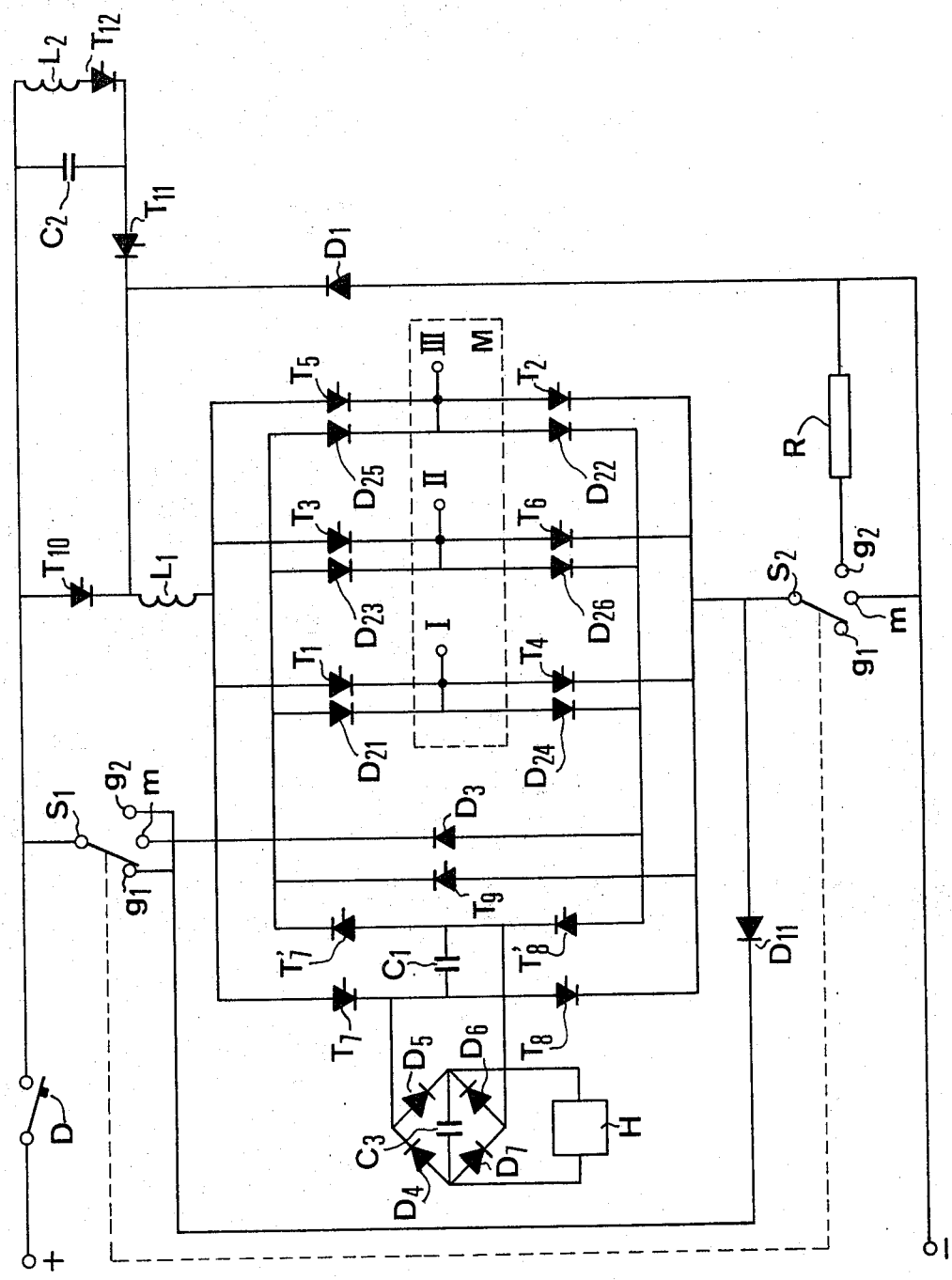

DEVICE FOR REGULATING AND SWITCHING CURRENTS FROM A CONSTANT D.C. SOURCE INTO THE WINDINGS OF AN A.C. MACHINE

BACKGROUND OF THE INVENTION

The invention relates to a device for regulating and switching current into the windings of a single-phase or multi-phase a.c. machine, more particularly a squirrel-cage asynchronous motor, so that the motor can operate at variable speeds and torques from a constant d.c. supply.

In their British patent application No. 34050/73 filed on 17.7.73, the applicants have already set out the basic features of systems for using a constant d.c. source to obtain adjustable d.c. currents which are successively routed, in accordance with the respective cycles, to the different phases of an a.c. machine in order to energise the machine at variable frequencies and voltages and thus regulate its speed and torque.

SUMMARY OF THE INVENTION

The invention relates to a device for regulating and switching current from a constant d.c. source into the windings of an a.c. ($n$-phase) machine, characterised in that it comprises the following, connected in series to the terminals of the source:

a current chopper providing d.c. currents having a given adjustable value from the current source, a smoothing inductor for the resulting currents, a thyristor bridge or "routing bridge" having $2n$ arms whose $n$ mid-points are respectively connected to the $n$-phase terminals of the machine, the ends of each of the two switching groups being respectively connected to the smoothing inductor output and the negative terminal of the source, the bridge being actuated so that the adjustable d.c. current supplied by the chopper and smoothing inductor is cyclically routed through the windings of the $n$-phases of the machine.

A diode bridge or "switching bridge" having $2n$ arms, whose $n$ mid-points are respectively connected to the $n$-phase terminals of the machine, the ends of each of the two switching groups being connected to a circuit for de-energising the thyristors of the routing bridge and to a switching circuit for progressively transferring the current from the switching bridge to the routing bridge, a circuit for de-energising the thyristors for each switching unit of the routing bridge, the circuit being connected between the unit and the corresponding switching unit of the switching bridge, a switching circuit for each switching unit of the switching bridge, the circuit being connected between a terminal of the source and the switching bridge, and selectors for isolating certain circuits and an auxiliary switching circuit for generator and braking operation of the machine, the auxiliary circuit being connected to the terminals of a condenser common to the two circuits for de-energising the thyristors of the routine bridge, and comprising a doide bridge having a diagonal in which a capacitor is inserted and shunted by an auxiliary chopper for maintaining a constant voltage at the terminals of the last-mentioned capacitor.

BRIEF DESCRIPTION OF THE DRAWING

The invention will be more easily understood from the following example of a device relating to a three-phase machine and from the accompanying diagram, showing the electric circuit of the device.

DESCRIPTION OF THE PREFERRED EMBODIMENT

In the diagram, the constant d.c. voltage source supplying the device is represented by its positive and negative terminals.

The chopper, which is of a known kind, comprises a main thyristor $T_{10}$, a de-energising thyristor $T_{11}$, a de-energising capacitor $C_2$ and its reversing circuit comprising inductor $L_2$ and thyristor $I_{12}$, and a flywheel-effect diode $D_1$. A smoothing inductor $L_1$ is connected in series with the chopper. The routing bridge, which comprises six thyristors $T_1$, $T_3$, $T_5$, $T_4$, $T_6$, $T_2$ has its three mid-points respectively connected to the phase I, II and III terminals of a three-phase machine M and to the ends of its two switching units $T_1$, $T_3$, $T_5$, and $T_4$, $T_6$, $T_2$ respectively connected to the output of the smoothing inductor $L_1$ and the negative terminal of the source.

The routing bridge is actuated by a known logic unit for cyclically routing the adjustable d.c. current delivered by the chopper and the inductor $L_1$ via the three windings for phase I, II and III of machine M.

The switching bridge, which comprises six diodes $D_{21}$, $D_{23}$, $D_{25}$, $D_{24}$, $D_{26}$, $D_{22}$ disposed in the same manner as the thyristors of the routing bridge, has its three mid-points respectively connected to the phase I, II and III terminals of machine M.

A circuit comprising thyristors $T_7$ and $T'_7$ and capacitor $C_1$ for de-energising the thyristors $T_1$, $T_3$, $T_5$ of the routing bridge is connected between the anodes of thyristors $I_1$, $T_3$, $T_5$ of the routing bridge and the anodes of diodes $D_{21}$, $D_{23}$, $D_{25}$ of the switching bridge.

The circuit for switching between the routing half-bridge $T_1$, $T_3$, $T_5$ and the switching half-bridge $D_{21}$, $D_{23}$ and $D_{25}$ comprises a thyristor $T_9$ whose anode is connected to the negative terminal of the source through a selector $S_2$.

A circuit comprising capacitor $C_1$ and thyristors $T_8$ and $T'_8$ for de-energising thyristors $T_4$, $T_6$, $T_2$ of the routing bridge is connected between the cathodes of thyristors $T_4$, $T_6$, $T_2$ of the routing bridge and the cathodes of diodes $D_{24}$, $D_{26}$, $D_{22}$ of the switching bridge.

The circuit for switching between the routing half-bridge $T_4$, $T_6$, $T_2$ and the switching half-bridge $D_{24}$, $D_{26}$, $D_{22}$ comprises a diode $D_3$ whose cathode is connected to the positive terminal of the source by a selector $S_1$ having three positions $g_1$, $m$ $g_2$, the contact stud $m$ being connected to the cathode of $D_3$ and the contact studs $g_1$ and $g_2$ being interconnected.

The auxiliary switching circuit used for regenerative braking and generating operation of machine M comprises a diode bridge $D_4$, $D_5$, $D_6$, $D_7$ and capacitor $C_3$ shunted by an auxiliary chopper H.

A second selector or switch $S_2$ which is identical with $S_1$ and is operated simultaneously, is connected via its central stud or contact and stud or contact $m$ between the cathodes of $T_4$, $T_6$, $T_2$ and the negative terminal of the source, its contact or stud $g_2$ being connected to the negative terminal via a resistor R.

The central contact or stud of selector $S_2$ is connected to stud $g_1$ of selector $S_1$ by a diode $D_{11}$ whose cathode is connected to contact $g_1$.

A cut-out switch D is connected to the input of the device.

The following two methods of operation are possible:

Regenerative braking by disposing selectors $S_1$ and $S_2$ at position $g_1$, and Rheostatic braking of resistor R by placing selectors $S_1$ and $S_2$ at position $g_2$ (in position $m$ corresponding to motor operation) and by opening switch D.

The detailed operation of the device is as follows:

a. Motor operation:

Selectors $S_1$ and $S_2$ are at position $m$. Switch D is closed.

We shall assume that, at a given moment, motor M is energised via its terminal I through thyristor $T_1$ and it is desired to route the charge to terminal II. Thyristor $T_1$ is de-energised by energising thyristors $T_7$ and $T'_7$.

Capacitor $C_1$, which is charged to its rated value by the voltage from the source (positive terminal to the right), raises the cathode of $D_{21}$ and consequently the cathode of $T_1$ to a higher potential than the anode of $T_1$, which is de-energised. $C_1$ discharges into the motor via $T_7$, $T'_7$ and $D_{21}$.

Next, $T_3$ and $T_9$ are energised. The current charging the motor, which is practically constant owing to inductor $L_1$, travels via $T_7$, $C_1$, $T'_7$, $D_{21}$ and recharges capacitor $C_1$ and reverses its polarity; then, when $C_1$ is recharged to its rated value, it travels via $T_3$ and thyristor $T_9$ and via diode $D_{21}$, thus applying potentials to the cathode of $D_{21}$ which progressively decrease with respect to the cathode of $T_3$, so that the charge progressively travels from $D_{21}$ to $D_{23}$ and $T_7$, $T'_7$ and $T_9$ are de-energised.

Operation is similar for switching from terminal I via thyristor $T_4$ to terminal II via thyristor $T_6$, for example.

Thyristor $T_4$ is de-energised by energising thyristors $T_8$, $T'_8$, capacitor $C_1$ having been charged to its rated value with reversed polarity during the preceding switching of the upper routing half-bridge. Next, $C_6$ is energised.

The current charging the motor reverses the charge of $C_1$ and then, after $C_1$ has reached its rated charge and its polarity has again been reversed, travels via diodes $D_{24}$ and $D_3$ and via thyristor $T_6$, resulting in progressive switching from $D_{24}$ to $T_6$ and the de-energisation of $T_8$ and $T'_8$.

b. Generator operation with regenerative braking:

Selectors $S_1$ and $S_2$ are at position $g_1$ and switch D is closed.

The current travels from the negative terminal of the source and travels via diode $D_1$, inductor $L_1$, one of the thyristors $T_1$, $T_3$, $T_5$, the motor M (in generator operation) one of the thyristors $T_4$, $T_6$, $T_2$, diode $D_{11}$ and the positive terminal of the source when the chopper does not conduct, and completes the circuit via inductor $L_1$, one of the thyristors $T_1$, $T_3$, $T_5$, machine M, one of the thyristors $T_4$, $T_6$, $T_2$, diode $D_{11}$ and thyristor $T_{10}$ when the chopper conducts.

Swtiching operations from one phase to another of machine M are made in the same manner as during motor operation but, when capacitor $C_1$ has reversed and recharged to its rated value, the current, instead of travelling via thyristor $T_9$ for switching the two upper half-bridges and diode $D_3$ for swithcing the two lower half-bridges, travels via the diode bridge $D_4$, $D_5$, $D_6$, $D_7$ and charges capacitor $C_3$, whose voltage at the terminals is kept constant by the auxiliary chopper H.

c. Generator operation with rheostatic braking:

Selectors $S_1$ and $S_2$ are at position $g_2$ and switch D is open.

Current flows into resistor R, diode $D_1$, inductor $L_1$, one of the thyristors $T_1$, $T_3$, $T_5$, machine M (in generator operation) and one of the thyristors $T_4$, $T_6$, $T_2$ when the chopper does not conduct, and completes the circuit via diode $D_{11}$, thyristor $T_{10}$, inductor $L_1$, one of the thyristors $T_1$, $T_3$, $T_5$, machine M and one of the thyristors $T_4$, $T_6$, $T_2$ when the chopper conducts.

Switching operations from one phase to another of machine M are performed in the same way as during regenerative braking operation.

The device according to the invention can give an a.c. machine the characteristics of a d.c. machine.

The invention is particularly applicable to speed selectors used in industry and to the energisation of traction motors.

I claim:

1. A system for the control and commutation of current from a D.C. source into the windings of a polyphase A.C. machine including means for connection in series to terminals of a D.C. source comprising, a current chopper providing D.C. currents having a given adjustable value from said source; a smoothing inductor for smoothing the currents from said chopper; a thyristor routing bridge having $2n$ arms with $n$ mid-points respectively connected to $n$ phase terminals of the A.C. machine, the ends of each of two groups being respectively connected to the smoothing inductor output and a negative terminal of the source, the bridge being configured and controllable so that the adjustable D.C. current supplied by the chopper and smoothing inductor is cyclically routed to windings of the $n$ phases of the A.C. machine; a diode commutating bridge having $2n$ arms, with $n$ mid-points respectively connected to the $n$ phase terminals of the A.C. machine; a circuit for de-energizing the thyristors of the routing bridge; a switching circuit for progressively transferring the current from the commutating bridge to the routing bridge; the ends of each of the two groups of said commutating bridge being connected to said circuit for de-energizing the thyristors of the routing bridge and to said switching circuit for progressively transferring the current from the commutating bridge to the routing bridge; said circuit for de-energizing the thyristors comprising two subcircuits for each de-energizing a group of thyristors of the routing bridge connected between a unit and the corresponding group of the commutating bridge; a capacitor connected in common with said two sub-circuits; said switching circuit comprising a circuit for each group of diodes of the commutating bridge connected between a terminal of the source and the commutating bridge; selectors for isolating certain of said circuits and an auxiliary switching circuit for generator and braking operation of the machine; an auxiliary switching circuit connected to the terminals of said capacitor common to the two sub-circuits for de-energizing the thyristors of the routing bridge, and comprising a diode bridge having a diagonal including a capacitor and an auxiliary chopper shunting said capacitor for maintaining a constant voltage at the terminals of the second-mentioned capacitor.

2. A system according to claim 1, wherein the circuit for de-energizing the two groups of routing bridge thyristors includes two pairs of thyristors and a capacitor, means connecting one pair of thyristors in series across the ends of the routing bridge and means connecting the other pair of thyristors in series across said commutating bridge, means connecting the capacitor across junction points of the two pairs of thyristors.

* * * * *